United States Patent
Lutian

(10) Patent No.: US 8,217,897 B2
(45) Date of Patent: *Jul. 10, 2012

(54) SPECKLE INTERFERENCE LASER TRACKING

(75) Inventor: John Lutian, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,412

(22) Filed: Nov. 17, 2011

(65) Prior Publication Data

US 2012/0092258 A1  Apr. 19, 2012

Related U.S. Application Data

(63) Continuation of application No. 11/600,352, filed on Nov. 16, 2006, now Pat. No. 8,089,465.

(51) Int. Cl.
G06F 3/033 (2006.01)
G02B 27/10 (2006.01)
G02B 27/30 (2006.01)
G02B 3/00 (2006.01)
G06M 7/00 (2006.01)

(52) U.S. Cl. ........ 345/166; 345/179; 345/163; 359/619; 359/641; 359/642; 250/221

(58) Field of Classification Search ............... 345/157, 345/163, 166, 179–181; 359/618–619, 641–642; 250/221

See application file for complete search history.

(56) References Cited

U.S. PATENT DOCUMENTS

| 4,647,771 A | 3/1987 | Kato |
| 2005/0243055 A1 | 11/2005 | Ranta et al. |
| 2007/0139381 A1 | 6/2007 | Spurlock et al. |
| 2007/0139659 A1 | 6/2007 | Hwang et al. |

OTHER PUBLICATIONS

Prosecution documents of U.S. Appl. No. 11/600,352, filed Nov. 16, 2006; First Named Inventor: John Lutian.

*Primary Examiner* — Lun-Yi Lao
*Assistant Examiner* — Jarurat Suteerawongsa
(74) *Attorney, Agent, or Firm* — Westman, Champlin & Kelly, P.A.

(57) ABSTRACT

An optical tracking system is disclosed that provides more precise tracking and better performance in an optical mouse. It involves provides a collimated laser, and imaging a reflection of the collimated laser, such that the reflection has a substantially linear phase gradient. The reflection of the laser includes a pattern of speckles due to optical interference effects. The speckles are imaged such that the substantially linear phase gradient restricts any variation in intensity of the imaging of the speckles during a translating motion of the reflection, thereby providing superior tracking performance.

19 Claims, 7 Drawing Sheets

SPECKLE INTERFERENCE LASER TRACKING

The present application is a continuation of and claims priority of U.S. patent application Ser. No. 11/600,352, filed Nov. 16, 2006, the content of which is hereby incorporated by reference in its entirety.

BACKGROUND

Optical tracking is important in a variety of applications, such as for optical computer mice. The performance of such mice has been limited, though, on low contrast surfaces and at low tracking speeds. A pressing need has been recognized for providing optical tracking systems with greater precision and reaction speed across a greater range of tracking speeds and a greater variety of surfaces.

The discussion above is merely provided for general background information and is not intended to be used as an aid in determining the scope of the claimed subject matter.

SUMMARY

An optical tracking system is disclosed that provides more precise tracking and better performance in an optical mouse. It involves providing a collimated laser, and imaging a reflection of the collimated laser, such that the reflection has a substantially linear phase gradient. The reflection of the laser includes a pattern of speckles due to optical interference effects. The speckles are imaged such that the substantially linear phase gradient restricts any variation in intensity of the imaging of the speckles during a translating motion of the reflection, thereby providing superior tracking performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Various embodiments provide more precise ways of tracking a laser signal on an optical surface. Some typical optical mice once relied on measuring motion with respect to special reference mousepads; more recently, optical mice have typically relied on illuminating a reflecting surface with a light-emitting diode (LED) or a laser, imaging the reflecting surface thus illuminated, and tracking relative motion of the image of the reflecting surface as a mouse containing the optical source and the imager were moved. However, there are inherent limitations to these techniques. The light necessarily undergoes a certain degree of diffraction effects between its emission and the surface, and between the reflecting surface and the imaging sensor. Optical elements such as lenses used to focus on the image of the reflecting surface also had the potential to introduce further diffraction effects.

Figure 1:
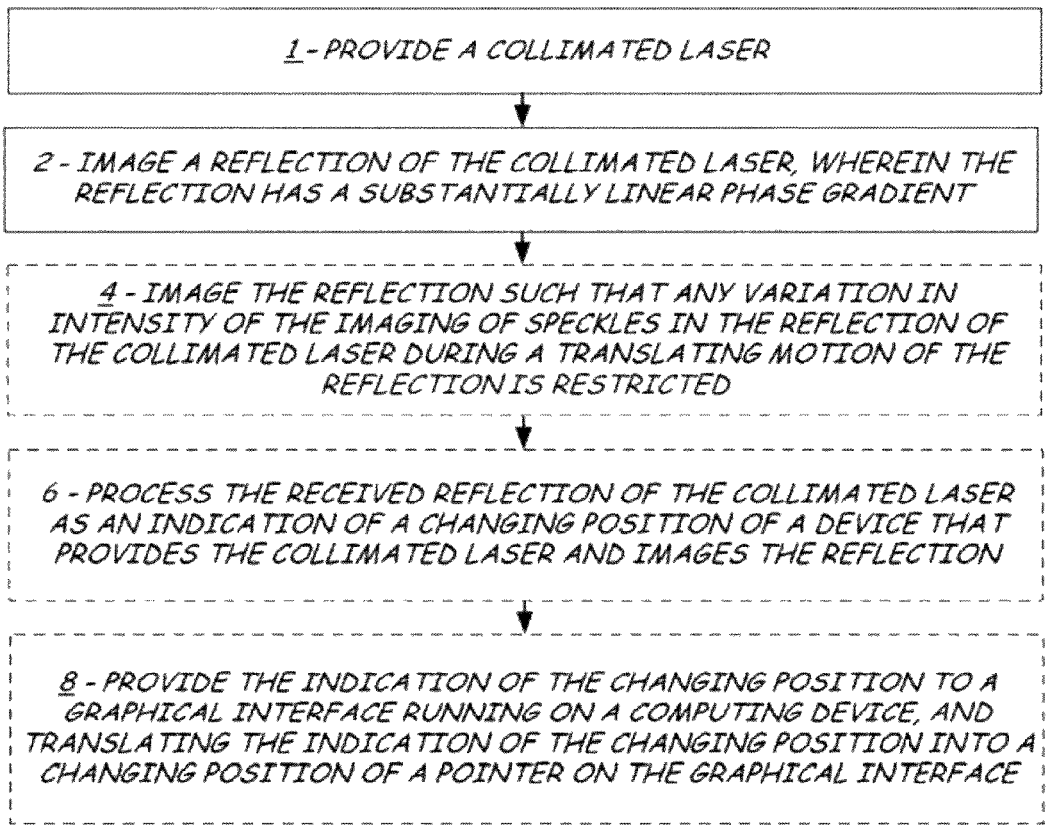
FIG. 1 depicts a laser tracking device according to an illustrative embodiment.

These limitations are addressed by various embodiments disclosed herein, according to a variety of different devices and methods, as illustratively depicted in FIG. 1 and the subsequent figures. FIG. 1. depicts a method 10, which may be implementable by a computing system, such as those depicted in FIGS. 6 and 7, for example. Method 10 includes step 1, of providing a collimated laser beam (which may be linearly, circularly, randomly, or otherwise polarized); and step 2, of imaging a reflection of the collimated laser, wherein the reflection has a substantially linear phase gradient. These steps may be further understood with reference to the illustrative devices 31, 41, and 51 of FIGS. 3, 4, and 5, which may be involved in performing the steps of FIG. 1 in accordance with certain illustrative embodiments. FIG. 1 also depicts additional optional steps in dashed outline, which are discussed further below.

Figure 2:
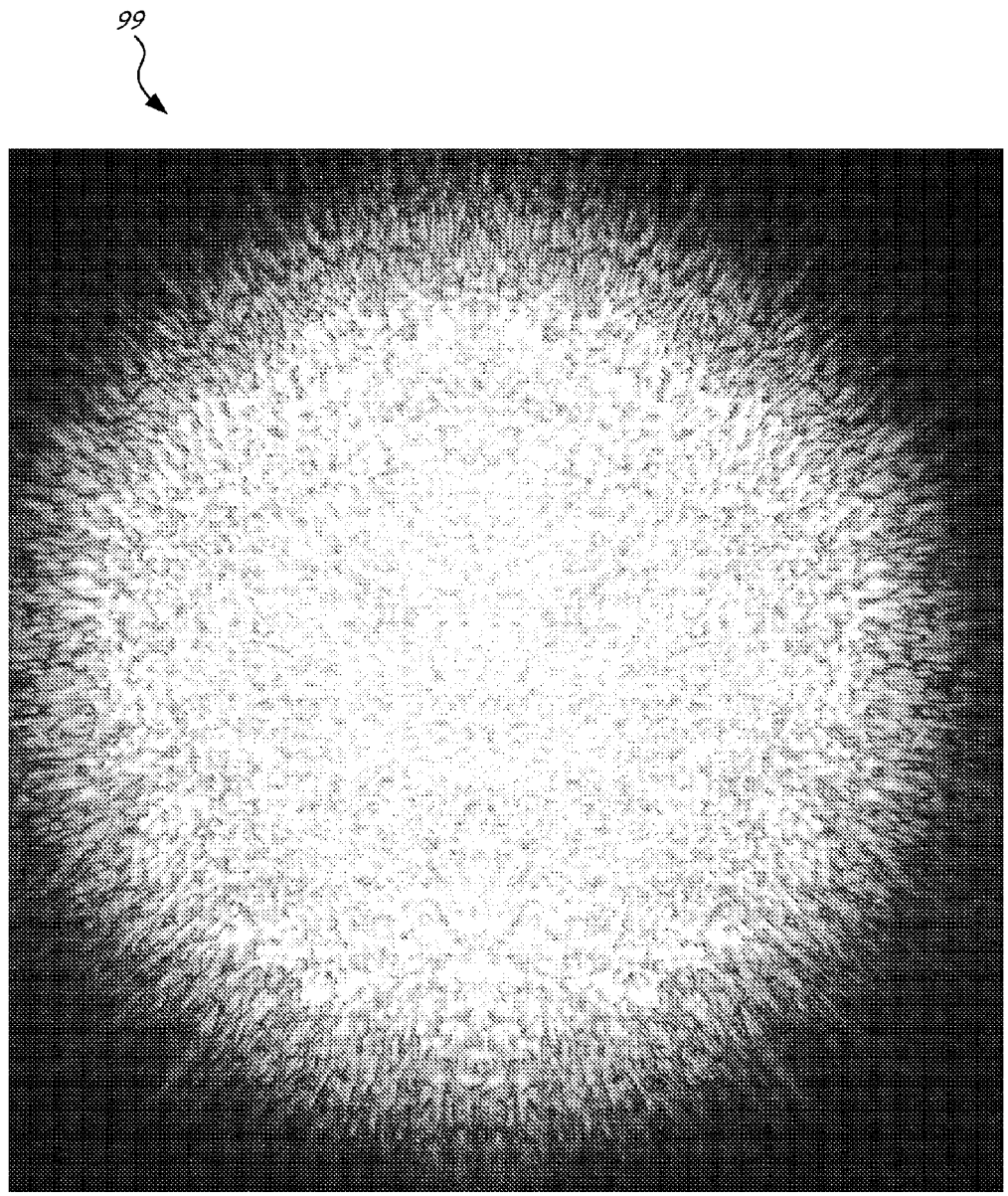
FIG. 2 depicts an image of a speckle in a reflection of a laser, according to an illustrative embodiment.

The reflection of the collimated laser as provided in step 1 may include a pattern of speckles; FIG. 2 provides an illustrative example of an imaged speckle 99 from a reflected laser, such as may illustratively be used by the embodiments disclosed herein, as is further discussed below. The imaged speckle 99 in FIG. 2 demonstrates the effectively random pattern of light and dark spots, corresponding to areas of high and low intensity in a reflection of a laser, due to constructive and destructive interference of reflected components of the laser, as is further explained below. Such a fine-grained pattern of light and dark spots arise spontaneously in the reflection of a laser on most surfaces, therefore making reflected speckle patterns particularly useful for laser tracking on a wide variety of surfaces.

Figure 3:
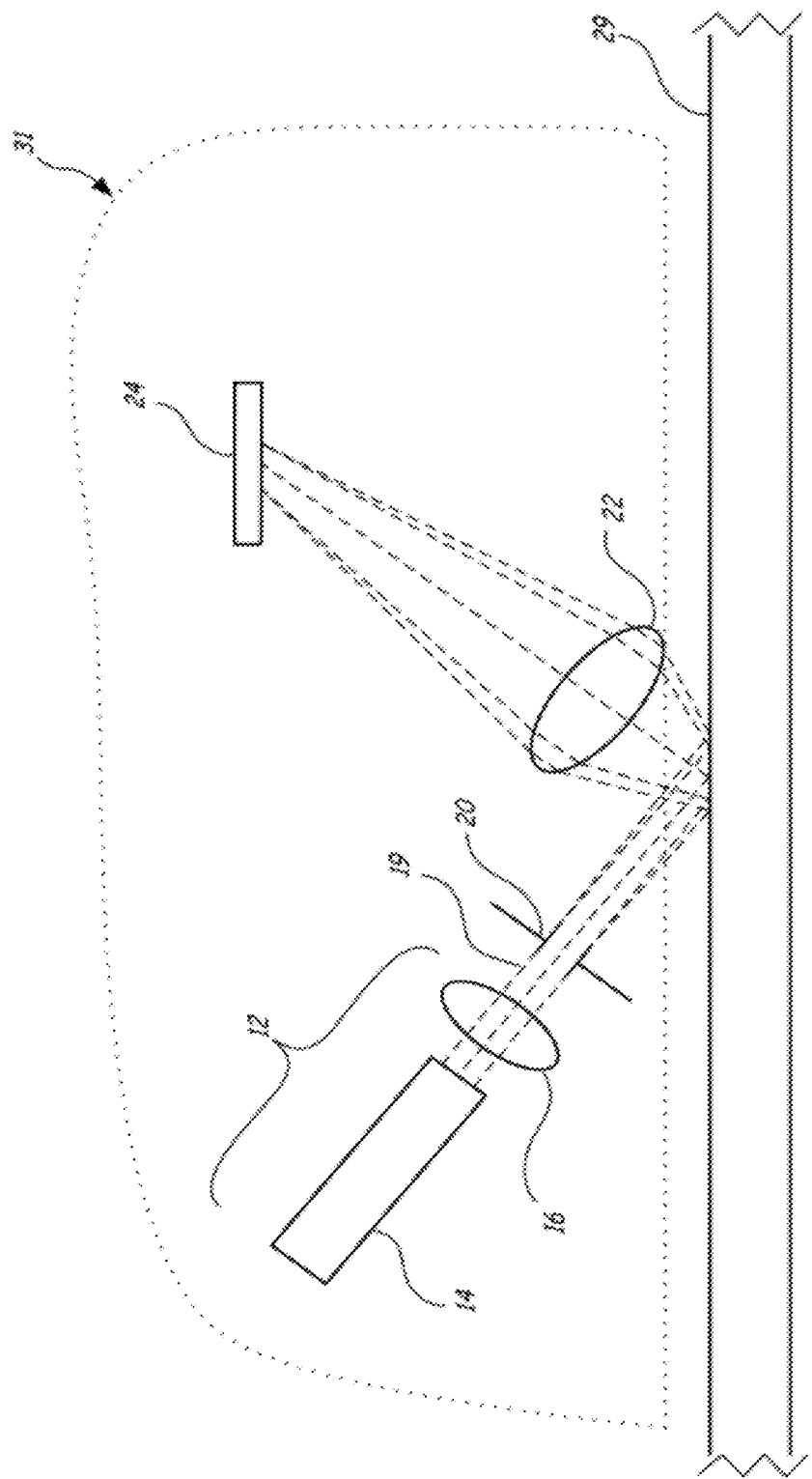
FIG. 3 depicts a laser tracking device according to another illustrative embodiment.

FIG. 3 may be considered together with FIG. 1 to illustrate the workings of the method steps in FIG. 1, according to one illustrative embodiment. The collimated laser as provided in step 1 of method 10 may be provided by collimated laser source 12 of device 31, which may illustratively be a laser mouse, for example. Collimated laser source 12 includes laser emitter 14 and collimator 16 in the beam path of laser emitter 14, so that a laser 19 emitted from laser emitter 14 passes through and is collimated by collimator 16, in this illustrative embodiment.

Laser 19 subsequently follows a beam path that takes it out of device 31 to reflect on an ambient reflecting surface 29, in this illustrative embodiment. It passes through aperture 20 on its way, in the illustrative embodiment of device 31 depicted in FIG. 3. Device 31 may be configured with a nominal clearance so that reflecting surface 29 is predictably in an anticipated position and orientation relative to the various components of device 31, as depicted in FIG. 3, as long as reflecting surface 29 is reasonably flat, for example, although a very broad variety of different types of surfaces may serve as reflecting surface 29 and function well in cooperation with device 31.

Lens 22 is disposed adjacent to imaging sensor 24, in the path of the reflection of laser 19 as it is reflected from surface 29. The laser 19 is reflected from surface 29, and the reflection, after passing through lens 22 in this embodiment, strikes imaging sensor 24 of device 31. Imaging sensor 24 may illustratively be composed mainly of a complementary metaloxide-semiconductor (CMOS) array, for example. It may also be a different type of imager such as a charge-coupled device (CCD) or any other type of imaging sensor.

When a laser is reflected from almost any type of surface, generally other than a finely machined and polished mirror or other optical element, its reflection includes a pattern of speckles. This is caused by mutual interference of components of the reflection from microscopic irregularities in the surface. Given irregularities on a typical scale greater than the wavelength of laser 19, as is the case with almost all surfaces, the phases of both the real and imaginary components of the wavefront of the reflection have uniform distributions that are not correlated with each other. This results in a negative exponential distribution in the intensity of the reflection on average, with randomly distributed local peaks in the intensity of the light within the reflection, where the phases of the wavefront components exhibit constructive interference with each other. These are surrounded by local darker areas, where the phases of the wavefront components exhibit destructive interference with each other. This is characterized as a speckle pattern.

The speckle pattern of the reflection therefore arises due to patterns of interference with random modifications of the phases of the wavefront components of the laser as it is reflected. The speckle patterns are therefore very sensitive to the phase gradient of the laser. However, non-linear phase gradient components are inevitably introduced into the laser through diffraction effects from any discontinuity through which it passes, including the source from which it emerges. Because of such a non-linear phase gradient, a tracking image of the reflection on the reflecting surface typically exhibits changes in local intensities, when relative phase relationships from speckle contributors are not preserved due to effectively non-linear phase components, as an image moves along the reflecting surface. This is particularly true for slow movements and small movements, for which variations in intensity of imaged speckles may be least predictable or most pronounced.

However, these effects are restricted or minimized by embodiments such as device 31 of FIG. 3, for example. Rather than imaging the reflection of the laser 19 on the reflecting surface 29, device 31 is configured to image the reflection of the collimated laser 19 with an image focus on aperture 20, which lies in the path of laser 19. The limiting effects that this addresses are described further as follows, after which the advantages of device 31 are further described.

Aperture 20 acts as a discontinuity in the path of laser 19. As with any wavefront passing through a narrow slit, aperture, or discontinuity, laser 19 can effectively be treated as emerging from aperture 20 as its local source. As it emerges through aperture 20, collimated laser 19 has minimized diffraction effects and a substantially linear phase gradient. The discontinuity of aperture 20 also introduces a new source of diffraction at its edges, however. For example, aperture 20 may be circular, and the circular edge of aperture 20 introduces a toroidal diffraction wavefront about the circumference of the beam, which diffuses across a greater part of the cross-section of the beam the farther it gets away from the discontinuity that introduced the diffraction effect.

By the time the laser 19 intercepts and reflects from reflecting surface 29, the diffraction wavefront has had a chance to spread across a significant fraction of the beam's cross-section, and distributes non-linear phase gradient components across much or all of the reflection. If the reflection of laser 19 is imaged with a focus on the reflecting surface 29, therefore, the imaging picks up on those substantial diffraction-induced non-linear phase gradient components, and therefore also receives random fluctuations in local intensity of the reflection, interfering with and limiting the precision and performance of the tracking.

In contrast, device 31 is configured to image the reflection of the collimated laser 19 with an image focus on aperture 20, as noted above. This is accomplished in part due to lens 22, which does not have its object plane on reflecting surface 29, but rather has a significantly longer focal length, to place its object plane at the location of aperture 20. This allows an image of the aperture 20 to be formed at the image plane of the system where imaging sensor 24 is located, as depicted in FIG. 3. In other embodiments, the reflection of the collimated laser 19 may be imaged with an image focus at other locations intermediate between a collimated laser source 12 and a reflecting surface 29. The focal length, to within normal design tolerances, is approximately equal to a sum of the path length between lens 22 and the reflecting surface 29 plus the path length between surface 29 and aperture 20, along the path followed by the laser 19 and its reflection. Lens 22 therefore images the reflecting surface 29 in a substantially unfocused manner, but relying on the continuity of the image of the aperture 20 through the incidence of reflection, and ignoring the image of the laser 20 at the position of reflection. Because the reflection of collimated laser 19 is imaged at imaging sensor 24 with an image focused on aperture 20, the image reconstructs the state of the beam of laser 19, along with its substantially linear phase gradient, at the position of aperture 20, at the very origin of the diffraction effects that introduced the non-linearities to the phase gradient. These components of device 31 therefore provide imaging of the reflection of collimated laser 19 such that its reflection has a substantially linear phase gradient. Device 31 is therefore configured for providing the reflection of the laser to the imaging sensor with a phase gradient having reduced nonlinearity; for example, this illustratively includes the nonlinearity of the phase gradient being significantly reduced as compared with an otherwise comparable device configured to provide the reflection to an imaging sensor such that the reflection is focused on the reflecting surface, and incorporates the diffraction effects and nonlinear phase gradient effects inherent in providing the reflection with its focus on the reflecting surface.

The components of device 31 also therefore image the reflection such that any variation in intensity of the imaging of speckles in the reflection of the collimated laser 19 during a translating motion of reflection is restricted, as in step 4 of method 10 in FIG. 1. Because the speckles are imaged with a substantially unmodulated phase and a substantially linear phase gradient, the interference patterns giving rise to the speckle pattern remains stable during translational motion of device 31 across the reflecting surface, any variations in the intensity of the individual speckles are relatively restricted, and the motion of device 31 across the reflecting surface 29 can be tracked much more rapidly and precisely.

Figure 6:
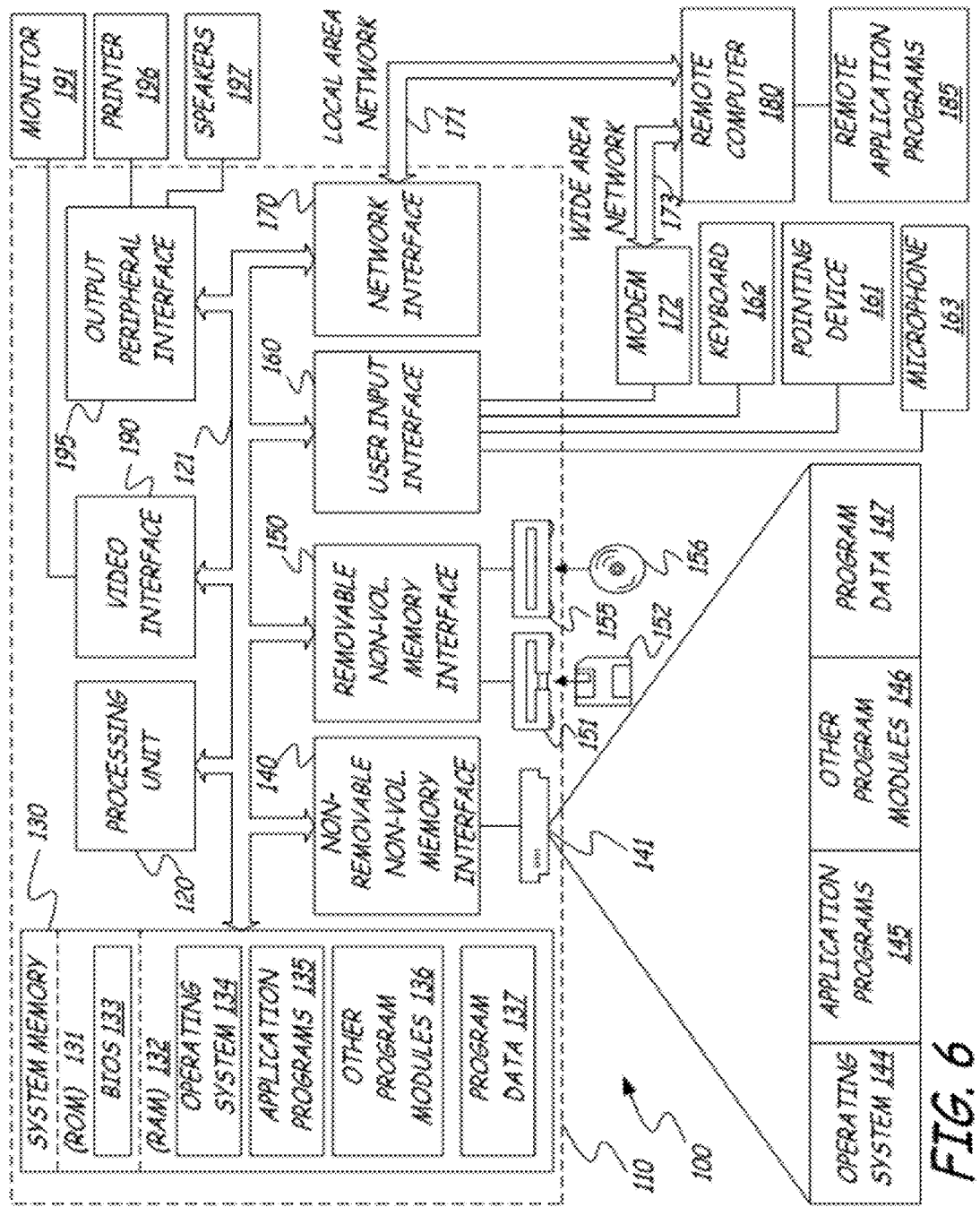
FIG. 6 depicts a block diagram of a computing environment in which some embodiments may be practiced.
Figure 7:
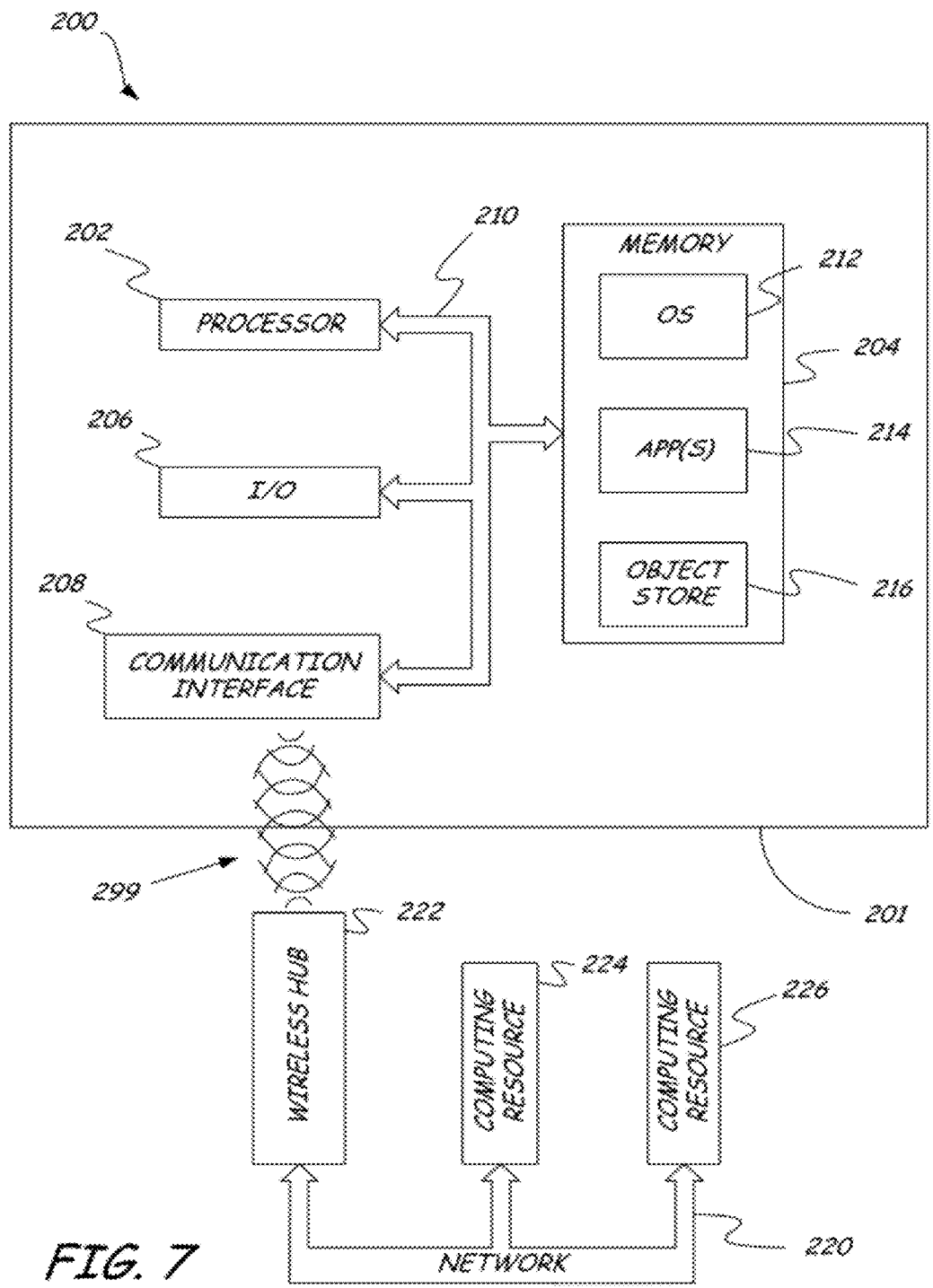
FIG. 7 depicts a block diagram of another computing environment in which some embodiments may be practiced.

FIG. 1 further depicts the step 6, of processing the received reflection of the collimated laser 19 as an indication of a changing position of device 31 that provides the collimated laser 19 and images the reflection; and step 8, of providing the indication of the changing position to a graphical user interface running on a computing device, such as those depicted in FIGS. 6 and 7, and translating the indication of the changing position into a changing position of a pointer on the graphical user interface. Step 6 may illustratively be performed by processing circuitry internal (not depicted in FIG. 3) to device 31 and delivered from an output component to an external computing system (not depicted in FIG. 3), while step 8 may illustratively be performed by a processor in a computing system with which device 31 is in operable communication, for example. The superior speed and precision of the tracking imaging by device 31 may therefore be advantageously applied as an optical mouse for engaging a graphical interface of a computing system.

Figure 4:
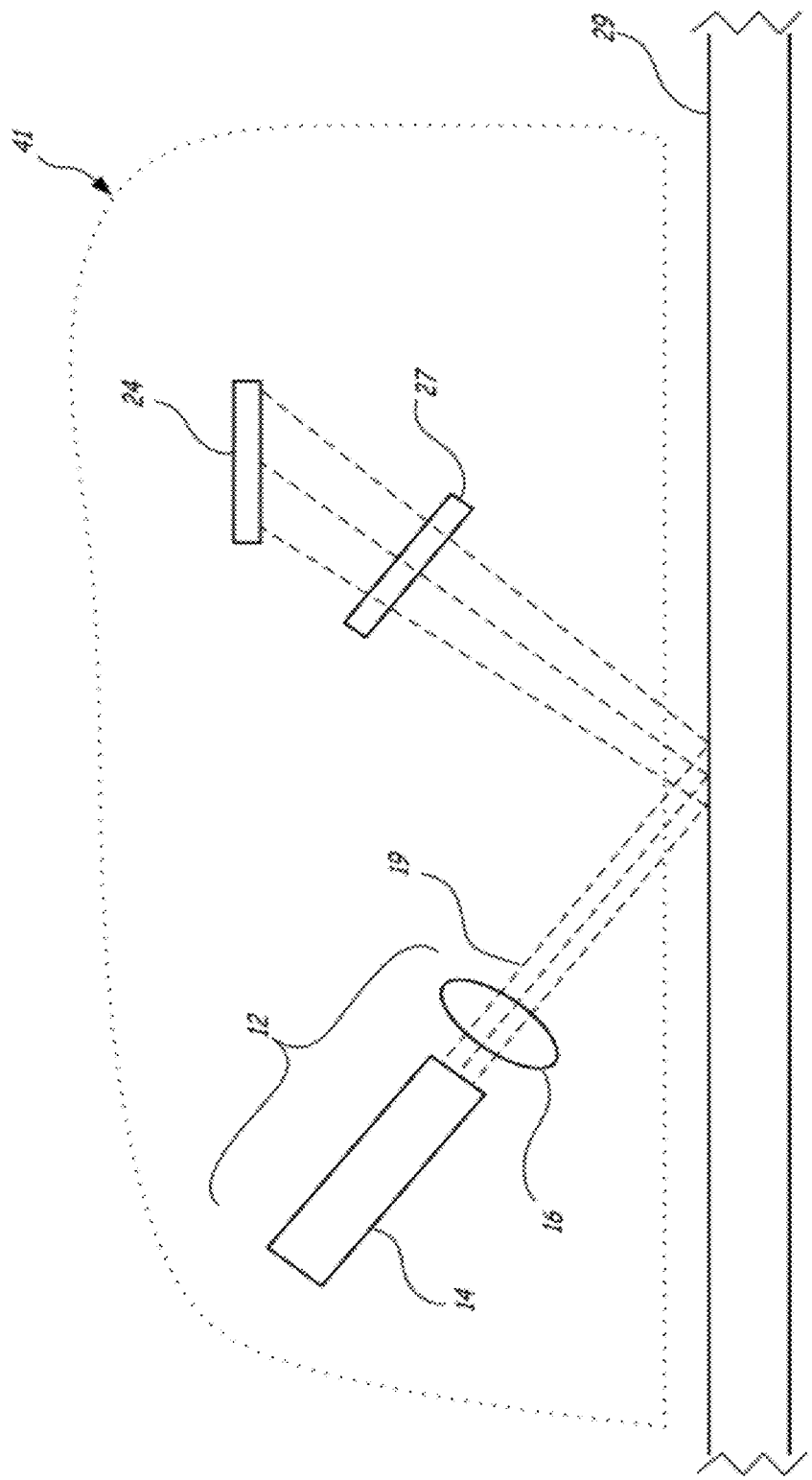
FIG. 4 depicts a laser tracking device according to another illustrative embodiment.

FIG. 4 depicts device 41, which provides a laser tracking device according to another illustrative embodiment. Device 41 also provides a collimated laser source 12 including a laser emitter 14 and collimator 16. Device 41 is likewise also disposed to target laser 19 from laser source 12 at a reflecting surface 29 and image the reflection at imaging sensor 24. Device 41 is configured such that imaging sensor 24 images the reflection of the collimated laser 19 directly as a scanned, reflected image, that is free of any focusing elements along the beam path between the source of laser 19 and the imaging sensor 24. Once laser 19 leaves collimator 16, it is reflected off of surface 29, and the reflection passes only through a flat, non-focusing window 27, before being intercepted by imaging sensor 24. Window 27 is flat on both sides and therefore substantially free of any focusing effect, and is disposed in the beam path only as an auxiliary structure to guard imaging sensor 24 from dust, electrostatic discharge, or other negative interaction with the ambient environment local to reflecting surface 29.

Because the beam path of laser 19 and its reflection are free of any focusing elements in this embodiment, or any intermediate discontinuities such as an aperture, there is once again no need to worry about the diffraction effects and non-linear phase gradient of an image focused on the reflecting surface 29. Rather, collimator 16 is configured in this embodiment to provide laser 19 such that it restricts the beam diameter of the laser, purely by the collimator optics rather than using an intermediate aperture. The restricted beam diameter thus provided helps to minimize any diffraction effects or non-linear phase gradient in the image of the reflection of the laser as it is received by imaging sensor 24, and to optimize the imaging of the speckle pattern by the imaging sensor 24. The speckle images in the reflection of the laser 19 may then be tracked with high precision by imaging sensor 24, and the signal therefrom may be delivered to an imaging processor (not depicted in FIG. 4) in operative connection with the imaging sensor 24, and translated into an indication of relative motion of the device. This reflects another illustrative embodiment demonstrating an exemplary implementation of inventive principles such as providing reflected speckle images with substantially linear phase gradients and minimized variation in intensity as a function of movement, thereby contributing to the speed and precision of a laser tracking device.

Figure 5:
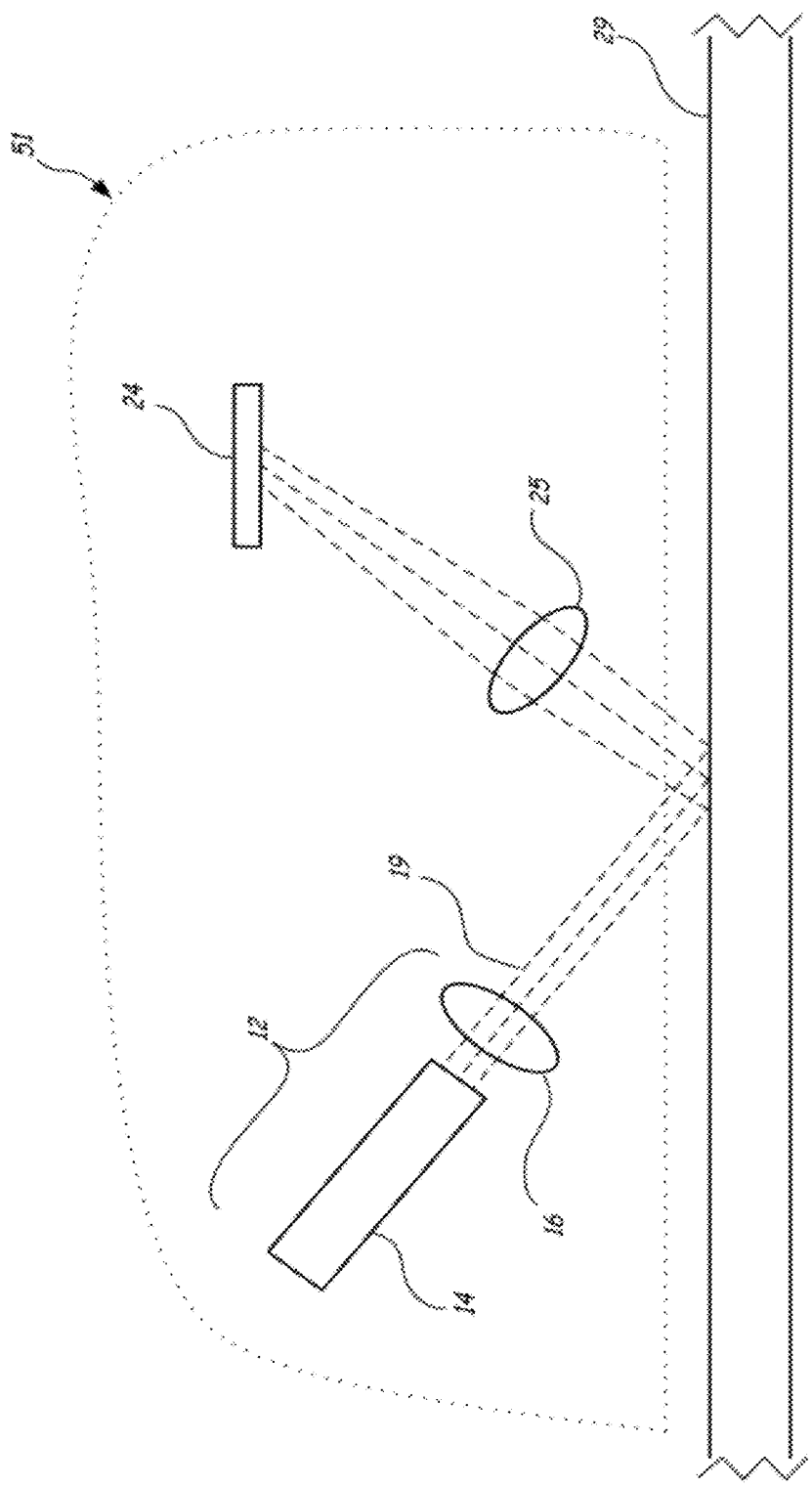
FIG. 5 depicts a flowchart of a method according to an illustrative embodiment.

FIG. 5 depicts yet another illustrative embodiment, based on device 51. Device 51 also includes a collimated laser source 12 including a laser emitter 14 and collimator 16, and is also disposed to target laser 19 from laser source 12 at a reflecting surface 29 and image the reflection at imaging sensor 24. Device 51 also includes a lens 25 in the beam path of the reflection of laser 19 from reflecting surface 29. Lens 25 gathers a broader cross-section of the reflection than might have been collected by device 41, and concentrates it onto imaging sensor 24, although again without focusing the image received by imaging sensor 24 on reflecting surface 29, and instead substantially preserving the linear phase gradient of laser from where it emerges from collimator 16. Device 51 therefore provides another illustrative embodiment, in addition to the other embodiments discussed herein, of a tracking device, such as an optical mouse, that has a means for ensuring that a phase gradient of the speckle pattern imaged by the imaging array remains substantially linear during a translating motion of the optical mouse.

FIG. 6 illustrates an example of a suitable computing system environment 100 with which various embodiments may be implemented. Computing system environment 100 as depicted in FIG. 6 is only one example of a suitable computing environment for functioning cooperatively with various embodiments, and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 6, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on remote computer 180. It will be appreciated that the network connections shown are exemplary and other means of establishing a communications link between the computers may be used.

FIG. 7 depicts a block diagram of a general mobile computing environment, comprising a mobile computing device and a medium, readable by the mobile computing device and comprising executable instructions that are executable by the mobile computing device, according to another illustrative embodiment. FIG. 7 depicts a block diagram of a mobile computing system 200 including mobile device 201, according to an illustrative embodiment. Mobile device 201 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may be the Internet, a wide area network, or a local area network, for example—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226. Naturally, any number of computing devices in any locations may be in communicative connection with network 220. Computing device 201 is enabled to make use of executable instructions stored on the media of memory component 204, such as executable instructions that enable computing device 201 to translate an indication of a changing position received from a laser mouse into a changing position of a pointer on a graphical interface, and other tasks, in a few illustrative embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A method of detecting movement of an input device positioned adjacent a reflecting surface, the method comprising:
   providing a collimated laser directed along a laser path at the reflecting surface that reflects the laser along a reflection path; and
   using an imaging sensor and a lens disposed between the imaging sensor and the reflecting surface to image a reflection of the collimated laser from the reflecting surface, the lens having a focal length longer than a distance between the lens and the reflecting surface, wherein an object plane of the lens is spaced from the reflecting surface along the laser path between a source of the collimated laser and the reflecting surface.

2. The method of claim 1, wherein the reflection has a substantially linear phase gradient.

3. The method of claim 2, wherein the reflection of the collimated laser comprises one or more speckles, and wherein imaging comprises:
   imaging the reflection such that any variation in intensity of the imaging of the speckles during a translating motion of the reflection is restricted.

4. The method of claim 1, further comprising processing the imaged reflection of the collimated laser as an indication of a changing position of the input device.

5. The method of claim 4, further comprising providing the indication of the changing position to a graphical interface running on a computing device, and translating the indication of the changing position into a changing position of a pointer on the graphical interface.

6. The method of claim 1, wherein the lens is adjacent the imaging sensor.

7. An input device configured to be positioned on a reflective surface, the input device comprising:
   a source of a collimated laser;
   an imaging sensor disposed for receiving a reflection of the laser off the reflective surface, wherein a reflective path extends from the reflective surface to the imaging sensor when the input device is positioned on the reflective surface; and
   a lens disposed between the imaging sensor and the reflective surface when the input device is positioned on the reflective surface, the lens having a focal length longer than a distance between the lens and the reflective surface such that the object plane of the lens is spaced from the reflective surface at a location between the source of the collimated laser and the reflective surface.

8. The input device of claim 7, wherein the reflection has a substantially linear phase gradient.

9. The input device of claim 7, wherein the imaging sensor comprises a complementary metal-oxide-semiconductor (CMOS) array.

10. The input device of claim 7, further comprising an imaging processor in operative connection with the imaging sensor, and configured to translate speckle images in the reflection of the laser into an indication of relative motion of the input device.

11. The input device of claim 10, further comprising an output component for providing the indication of relative motion of the device to a computing device.

12. The input device of claim 7, wherein the lens is adjacent the imaging sensor.

13. An input device configured to be positioned on a reflective surface, the input device comprising:
   a source of a collimated laser;

an imaging sensor disposed for receiving a reflection of the laser off the reflective surface, wherein a reflective path extends from the reflective surface to the imaging sensor; and a lens disposed in the reflective path and having a focal length longer than a distance between the lens and the reflective surface that reflects the laser onto the lens, the imaging sensor being configured to image the reflection of the laser off the reflective surface with an image focus on the source of the collimated laser.

14. The input device of claim 13, wherein, when the input device is positioned on the reflective surface, a first path length is defined between the source of the collimate laser and the reflective surface and a second path length is defined between the reflective surface and the lens, wherein the lens has a focal length substantially equal to a sum of the first path length and the second path length.

15. The input device of claim 13, wherein the reflection has a substantially linear phase gradient.

16. The input device of claim 13, wherein the imaging sensor comprises a complementary metal-oxide-semiconductor (CMOS) array.

17. The input device of claim 13, further comprising an imaging processor in operative connection with the imaging sensor, and configured to translate speckle images in the reflection of the laser into an indication of relative motion of the input device.

18. The input device of claim 13, further comprising an output component for providing the indication of relative motion of the device to a computing device.

19. The input device of claim 13, wherein the lens is adjacent the imaging sensor.

* * * * *